United States Patent

[11] 3,629,005

[72] Inventor Dallas J. B. Belden
　　　　　　Route 1, Box 311, Rochester, Wash. 98579
[21] Appl. No. 753,514
[22] Filed Aug. 19, 1968
[45] Patented Dec. 21, 1971

[54] MILKING UNIT SANITIZER
　　　1 Claim, 3 Drawing Figs.
[52] U.S. Cl. .................................................. 134/171
[51] Int. Cl. .................................................. B08b 3/02
[50] Field of Search ........................................ 134/44, 54,
　　　　　　　　　　　166, 166 C, 167 C, 168 C, 169 C, 171

[56] References Cited
　　　UNITED STATES PATENTS

| | | | |
|---|---|---|---|
| 784,755 | 3/1905 | Pein | 134/44 |
| 1,946,400 | 2/1934 | Hapgood | 134/171 |
| 2,228,520 | 1/1941 | Hodson | 134/171 |
| 2,680,445 | 6/1954 | Hemminger | 134/171 X |
| 3,012,566 | 12/1961 | Baker | 134/171 X |

FOREIGN PATENTS

| | | | |
|---|---|---|---|
| 22,449 | 11/1901 | Great Britain | 134/171 |
| 293,140 | 7/1928 | Great Britain | 134/166 |
| 1,035,004 | 7/1966 | Great Britain | 134/166 |

*Primary Examiner* — Daniel Blum
*Attorney* — Christensen & Sanborn

ABSTRACT: Each individual treat cup of a suction milking unit can be easily sanitized using the disclosed sanitizing system for injecting a sanitizing solution into the milking chamber thereof. The sanitizing unit includes elongated supply conduits having nozzles positioned at one end for spraying the sanitizing solution into the milking chambers as the nozzles are inserted into the teat cups. In between milkings the sanitizing unit can be used for storing the milking unit. Guide cups adjacent the nozzle end of the conduits provide guiding surfaces for engaging the exterior shell surfaces of the treat cups such that the nozzles will be properly positioned within the milking chamber. A fresh supply of sanitizing solution is used for each sanitation flush of each teat cup.

PATENTED DEC 21 1971 3,629,005
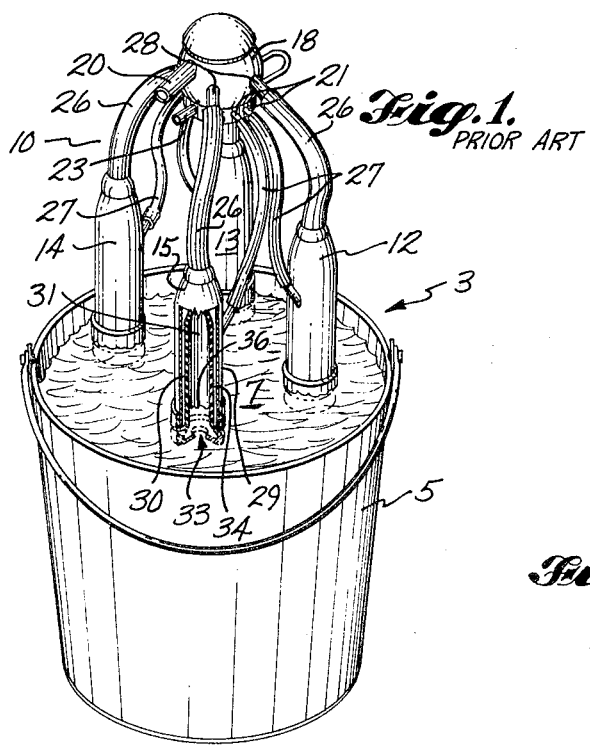
Fig. 1. PRIOR ART
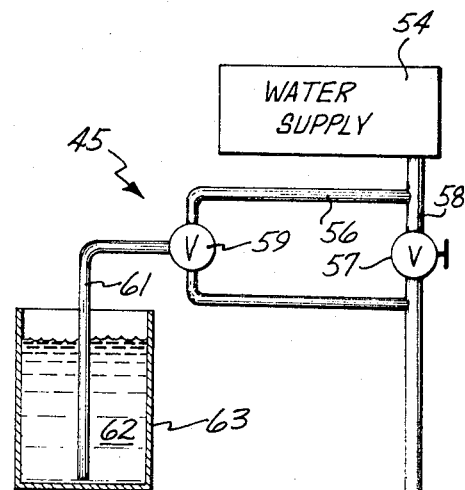
Fig. 2.
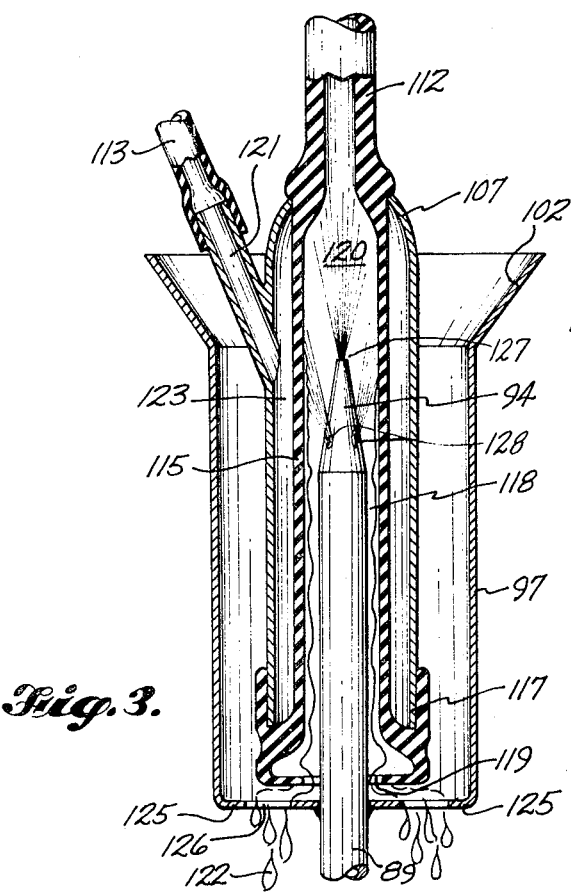
Fig. 3.
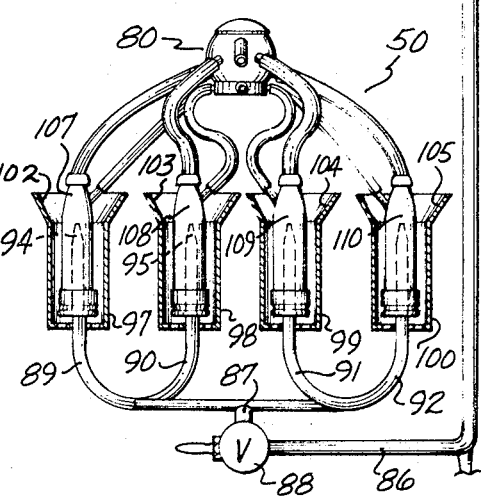
INVENTOR
DALLAS J. B. BELDEN
BY
Christensen, Sanborn & Matthews
ATTORNEYS

MILKING UNIT SANITIZER

BACKGROUND OF THE INVENTION

1. Field of the Invention

This invention relates to sanitizing equipment and more particularly to a sanitizing unit for cleansing the interior portions of the teat cups used in automated dairy farm operations.

2. Description of the Prior Art

The use of suction equipment for milking dairy cows has become the universal practice for dairy farm operators in most modern farming areas. The speed and convenience of such milk gathering systems have increased their popularity. A key piece of equipment in such an operation is the actual milking unit which includes some type of suction cup arrangement for holding and massaging the dairy cows'teats for the purpose of extracting milk. Suction lines communicate the extracted milk from the milking chamber of the teat cups to collection tanks located in the milking barn. Each individual milking unit is used for milking a number of cows during any particular day. It is therefore very important that teat cups are kept as clean as possible so that any diseases, such as bovine mastitis, present on the teats of one dairy cow will not be transmitted through a teat cup to other cows in the herd. To minimize such incidence of transmission of disease several washing systems for the teats have been devised and it has been general practice to submerge the teat cups into a bucket containing a sanitizing solution at periodic intervals such as between individual cow hookups.

In automatic milking operations with individual collection buckets connected to each milking unit, it is possible to disconnect the milking unit from the suction lines or the collection tank thereby permitting a free passage of any sanitizing fluid from the bucket through the lines of the milking unit as the milking unit becomes submerged in the sanitizing solution in the bucket. However, such disconnection of the milking unit from suction lines is generally of enough inconvenience that it is not done very often. In some cases such clear passage of the sanitizing solution throughout the milking unit takes place only on particularly thorough cleanup days.

If the milking unit is left connected to its suction lines it is not possible for the submersion of the milking cups in the bucket to effectively clean the interior of the individual milking cups since the air trapped between the milking cups and the suction valve prevents the sanitizing solution from entering into the deeper portions of the milking cups. As an illustration of this problem it is noted that a drinking glass when inverted and pushed up and down with its open end pointed downwardly into a basin or bucket of water will not become wet in the inner chamber of the glass due to the volume of the glass containing air thereby preventing any fluid in the bucket or basin from entering into that portion of the glass occupied by the air. Without recognizing this deficiency dairy farmers are lulled into a false security when they practice the immersion of the milking cups into a bucket containing sanitizing solution. In addition, the sanitizing solution held in the bucket becomes contaminated by milk, dirt and other materials which might accumulate in it as the milking unit is immersed into the bucket. Such an ineffective solution provides no sanitation whatsoever and requires that the dairy operator replace the contents of the bucket periodically.

Often, the residual milk left in the milking chambers of the teat cups after they are taken off of the teats of the cow has a tendency to drip and add a film of milk residue forming a cheeselike material in the area where the milking unit is hung between individual milkings. This residue is attractive to flies and although this area may be scrubbed and painted over on occasion, it is very difficult to adequately remove the residue once it has dried in place.

OBJECTS AND SUMMARY OF INVENTION

In view of the need for adequate sanitation of the teat cups of automatic milking equipment between each individual use of the cups it is a principal object of the instant invention to provide a generally improved milking unit sanitizer which can be effectively and easily used without requiring the disconnection of the milking unit from its suction lines.

It is another object of the instant invention to provide an improved sanitizing unit for automatic milking equipment which can be conveniently located for use as a storage receptacle for a milking unit in the period between milkings.

A further object of the instant invention is to provide a teat cup sanitizing unit which provides a thorough and complete flushing of the interior of the milking chamber of each teat cup with a fresh sanitizing solution.

An additional object of the instant invention is to provide an improved milking unit sanitizing system which includes positioning and guiding surfaces for guiding the individual teat cups onto the washing nozzles of the unit in a quick easy to perform movement of the milking unit by the operator.

A related object of the instant invention is to provide an improved milking unit holder which includes a sanitizing system for not only sanitizing the individual milking cups but also flushing away any residual milk from the cups to eliminate the formation of an unsanitary and unsightly milk film residue.

In accordance with the present invention a sanitizing unit is provided at each station having a milking unit in the dairy barn. The sanitizing unit includes a series of upwardly projected nozzle tipped elongated conduits surrounded by guiding cups having upwardly inclined open ends for receiving the downwardly projected individual teat cups and guiding them such that the nozzles are inserted into the milking chambers formed by the cups. A valve system connects the individual conduits to a source of sanitizing solution under pressure. As the valve is cycled a fresh batch of sanitizing solution is sprayed out of the nozzles and flushes out each milking chamber. The bottom portion of the guiding cups includes drain apertures permitting the residual milk diluted by the sanitizing solution to drain clear from the sanitizing unit. The sanitizing unit is used as a storage rack for the milking unit in between milking operations.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is an isometric drawing illustrating the prior art bucket immersion technique for milking unit sanitizing;

FIG. 2 is a schematic drawing illustrating an improved system for milking unit sanitizing in accordance with the instant invention; and FIG. 3 is a side section view of one portion of the sanitizing system shown in FIG. 2 illustrating in larger scale the relationship between the sanitizing unit and teat cup following the practices of the instant invention.

DESCRIPTION OF THE PREFERRED EMBODIMENT

FIG. 1 illustrates one prior art technique for milking unit sanitation and also presents an illustration of a modern milking unit currently in use in dairy operations. In the prior art sanitizing system 3 a bucket 5 is utilized to contain a washing solution 7. Such a solution may include industry-recommended sanitizing material such as, for example, a diluted iodine solution. The milking unit 10 includes four milking cups 12, 13, 14 and 15 which are in communication with the central claw member 18 through branch milk lines 26 and branch pulsating lines 27. Claw 18 includes a series of inlet connections 28 for the branch milk lines 26 and other connections 21 for the branch pulsating lines 27. Claw 18 may include a milk line suction valve (not shown) which can be used to close off the suction created in the milk line discharge outlet 20 of the claw 18. The pulsating suction outlet 23 is in communication with another chamber formed in claw 18 and provides communication between this chamber and the pulsating suction main line (not shown). Thus claw 18 provides a connection between a pulsating suction source from the pulsating suction outlet 23 to the individual branch pulsating lines 27, while at the same time providing a milk conveying suction communication between the main milk discharge outlet 20 and the individual branch milk lines 26.

With continued reference to FIG. 1 it is noted that the milking cup 15 is shown in section to illustrate its construction which includes an open-ended cup shell 29 which contains a liner 30 which provides communication between the branch milk line 26 and the milking chamber 31 formed by the liner 30 as it extends from one end of cup shell 29 to the other where it forms a chamber opening 33. Between the liner walls 30 and the walls of the cup shell 29 there is established a pulsating chamber 34 in communication with the branch pulsating line 27. Pulsator action alternately admits and evacuates air between teat cup shell 29 and liner 30. When air is admitted, liner 30 flexes against the teat in a gentle massage which stimulates the teats, maintains blood circulation and prevents congestion. When air is evacuated, liner 30 resumes its natural shape and milk flows through branch line 26. When the cup 15 is immersed in the washing solution 7 the air occupying the milking chamber 31 has no place to go such that it prevents the washing solution 7 from passing beyond the rinse solution level 36 in the teat chamber 31. It is therefore seen that such an immersion does not truly provide adequate rinsing of the milking chamber 31.

To cut off the vacuum between the main milking line discharge 20 and the individual branch milking lines 26 the milk line suction valve may be used to block the milk line discharge outlet 20. In addition, or in the alternative, the outlet 28 between connector member 18 and the individual branch lines 26 may define a spoutlike aperture having a configuration that will permit blocking of the aperture by the sidewalls of the branch milk line 26 and line 26 is permitted to hang by its own weight and the weight of the teat cup from the claw 18 in the generally downwardly extending position as shown in FIG. 1. In either case there is air trapped in the branch milk line 26 which prevents the adequate rinsing of the individual milking cups 12 to 15 by means of the prior art bucket system. In addition, milk, manure or other residual dirt or contamination which might contact teat cups 12 to 15 or other parts of the milking unit 10 become washed off of the milking unit 10 and contaminate the washing solution 7 held in bucket 5. Such contamination if not eliminated by changing the sanitizing solution often in the bucket 5 can actually aggravate an unsanitized condition for the milking unit 10 rather than eliminate one.

With reference to FIG. 2, it is noted that improved sanitizer system 45 made in accordance with the instant invention is illustrated in schematic form. Sanitizer 45 includes a number of sanitizer units such as the illustrated units 48 and 50 which are in communication with a common sanitizer supply line 52 extending from water supply 54 to the units 48 and 50. Adjacent to the outlet from water supply 54 there is provided a solution bypass line 56 which makes a loop around a gate valve 57 in the through line 58. Positioned along bypass line 56 is a mixing valve 59 which has one connection in communication with a pickup line 61 inserted into the concentrated sanitizing solution 62 contained in a solution supply tank 63. As the gate valve 57 is operated to restrict the water passage along line 58, more water under pressure from water supply 54 passes through the bypass line 56 through the mixing valve 59 carrying with it sanitizer solution 62. Mixing valve 59 may be of a venturi-type construction providing the necessary suction force for bringing the solution 62 to the mixing valve 59 where it is mixed with the water supply. Other systems providing the same function may also be used.

As the mixed sanitizer and water solution is conveyed it proceeds along sanitizer supply line 52 it is directed toward the location of sanitizer unit 48. A unit valve 69 provides a communication with sanitizer supply line 52 through supply connection line 71. On the other side of unit valve 69 is an outlet connection line 72 providing continued communication of the sanitizing solution to discharge conduits 74. As shown the discharge conduits 74 extends from the outlet connection conduit 72 to the interior of guiding cups 76 where they terminate at nozzles 75. The guiding cups 76 are formed to present upwardly extending side walls blending into inclined guiding surfaces 77 which define a teat cup opening 78 for insertion of the teat cups into the guiding cup 76.

Also shown in FIG. 2 is the sanitizer unit 50 similar in construction to sanitizer unit 48 but illustrated in a position where it is supporting and holding the milking unit 80. In a similar manner supply line 86 provides communication between the sanitizer supply line 52 and the sanitizer unit 50 through unit valve 88 having an outlet line 87 communicating with discharge conduits 89, 90, 91 and 92. Discharge nozzles comprising an upwardly converging frustoconical section having a coaxial discharge aperture 127 and a plurality of side-pointing discharge apertures 128 are provided at the ends of the discharge conduits, for example discharge nozzle 94 is positioned at the end of discharge conduit 89, and discharge nozzle 95 is positioned at the end of discharge conduit 90. Each of the discharge nozzles provides a means for discharging the sanitizer solution from the sanitizer unit 50. Surrounding each of the discharge conduits 89 to 92 are upwardly projecting guide cups 97, 98, 99 and 100 which terminate in outwardly and slanting guiding surfaces 102, 103, 104 and 105. As shown, the teat cups 107, 108, 109 and 110 are positioned with the openings of the teat cups at the lower end thereof and inserted into the guide cups 97 to 100.

In more detail, FIG. 3 in larger scale illustrates the relative position between teat cup 107 and guide cup 97 of unit sanitizer 50. As shown, branch milk line 112 and pulsating vacuum branch line 113 are connected to teat cup 107 such that the massaging liner walls 115 extending from the milk line 112 to the lip 117 define within liner 115 milking chamber 118 having a chamber opening 119. Discharge conduit 89 is inserted into milking chamber 118 through chamber opening 119 with nozzle 94 positioned deeply into chamber 118. Sanitizing spray 120 emitting from the nozzle 94 provides full and complete flushing of milking chamber 118 with the sanitizing solution.

Pulsating suction outlet 121 of milking cup 107 connects pulsating suction line 113 to the pulsating chamber 123 formed between the massaging liner 115 and the teat cup shell 107. Even as the pulsating vacuum continues the collapsing and relaxation of massaging liner 115, sanitizing spray 120 continues its flushing and washing of the milking chamber 118. The spent solution mixed with the residual milk, identified with numeral 122, exits from the chamber opening 119 into the bottom portion of guide cup 97. As shown, guide cup 97 includes a bottom wall 125 which defines within it drain apertures 126 permitting easy drainage of spent solution 122 from the sanitizing unit 50.

In operation milking unit 80 is removed from the cow at the end of the milking operation and contains within the milking chambers 118 a residue of milk. Unit 80 is then held by the operator so that the milk lines 112 and vacuum lines 113 dangle the milk cup 107 with milking chamber opening 119 positioned at the lower end facing downwardly. Milking unit 80 is then positioned over the sanitizing unit 50 such that the guiding surfaces 102 of the guide cup 97 make contact with the lower ends of teat cup 107 guiding discharge conduit 89 through the chamber opening 119 into the milking chamber 118. Valve 88 is cycled permitting communication between the supply line 86 and the outlet line 87 for the sanitizing solution from sanitizer supply line 52 under pressure to the individual discharge conduit 89 and discharge nozzle 94. The nozzle 94 emits sanitizing spray 120 which flushes milking chamber 118 and milk lines 112, sanitizing the chamber, and spent sanitizing and mixed milk solution 122 is permitted to drain freely from the bottom walls 125 of the cups 97 through the drain apertures 126. Milking unit 80 may be left for storage purposes in the sanitizing unit 50 until the next milking operation is to begin. Although it has been disclosed that the sanitizing units receive a sanitizing solution supply under pressure it is also possible to spray a clear water or other solution through the nozzles by providing additional fluid supply and valve systems discharging into the units. With such installations clear water could be used to flush away the sanitizing solution.

Thus it is seen that there has been provided a convenient, easily used and effective system for completely sanitizing the milking chamber of teat cups without requiring the milking operation to be interrupted for a significant period which was previously required for disconnecting the vacuum connections and completely rinsing out the milking units. In addition, the limitations of the bucket-immersion sanitizing system have been overcome through the use of a fresh supply of sanitizing solution for each teat cup and the complete coverage of the milking chamber by the sanitizing solution.

What is claimed is:

1. An apparatus for washing the interior surfaces of a teat milking cup and milking system suction lines which provides for direct drainage of mixed washing solution and milk from the apparatus to the floor of the milking station without the use of enclosed drainage conduits or other apparatus in which a buildup of residual milk solids can occur, said apparatus comprising:

Valve means having supply and outlet connections for receiving a washing solution under pressure and selectively permitting passage of said solution from said supply connection to said outlet connection;

an elongated conduit having one end thereof in communication with said outlet connection for receiving a supply of said solution under pressure and a nozzle means positioned at another end thereof for discharging said solution from said conduit, said nozzle means and the portion of said conduit adjacent to said nozzle means being adapted for insertion within the milking chamber established by said teat cup so that said nozzle means is positioned deeply within said milking chamber; and, guide means positioned adjacent to said nozzle means having a guiding surface contacting said teat cup for guiding the opening of said milking chamber onto said nozzle means, said guide means comprising a substantially cup-shaped member having said elongated conduit extending upwardly therethrough, the bottom portion of said cup-shaped member defining a plurality of drain apertures opening directly to the atmosphere for free and unimpeded drainage of said solution from said apparatus to prevent the buildup of residue therein.

* * * * *